Oct. 31, 1933.   L. E. LA BRIE   1,932,899
BRAKE
Filed April 16, 1928
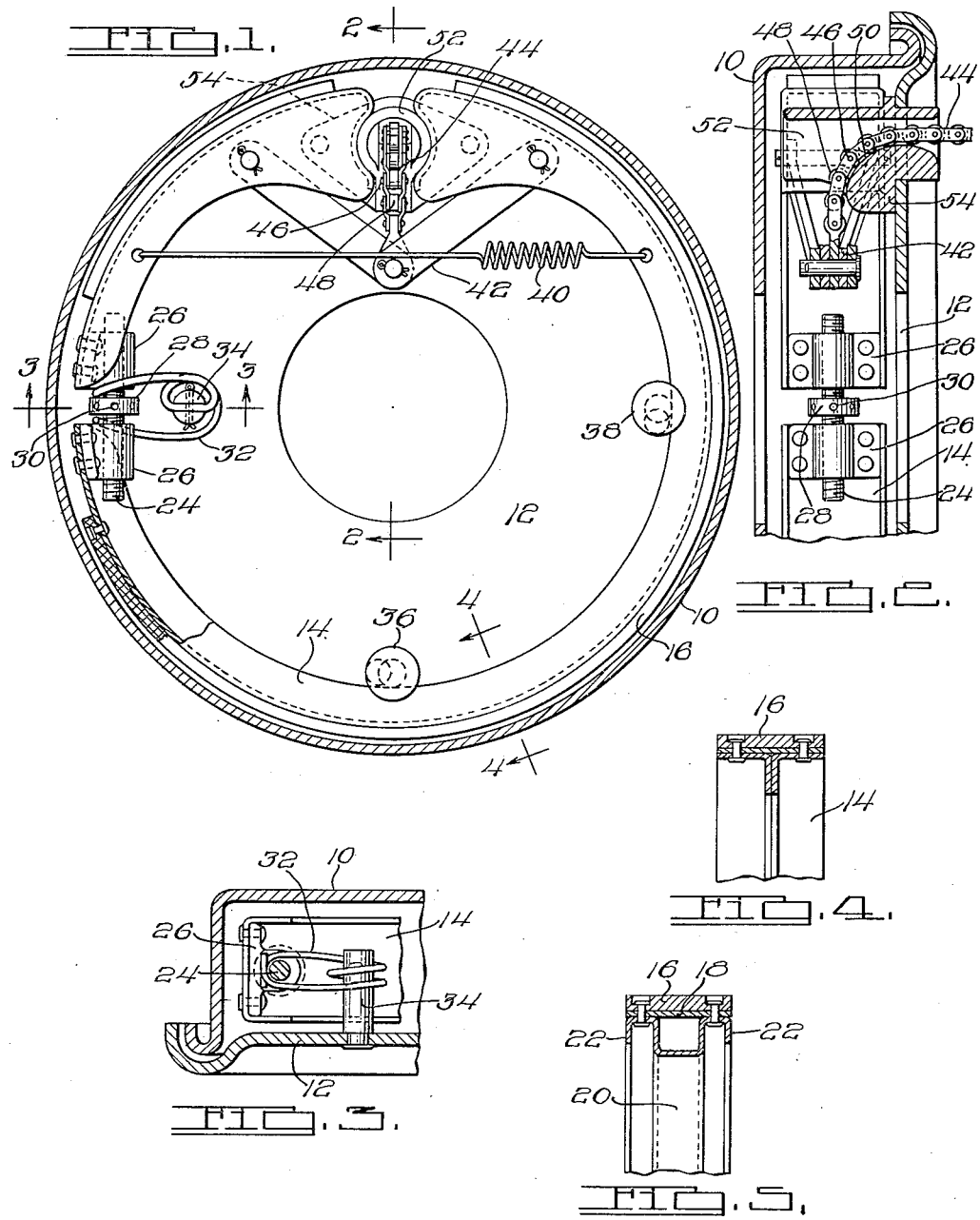
INVENTOR
*Ludger E. La Brie*
BY
*J. W. McConkey*
ATTORNEY

UNITED STATES PATENT OFFICE 1,932,899

BRAKE

Ludger E. La Brie, South Bend, Ind., assignor to Bendix Brake Company, South Bend, Ind., a corporation of Illinois Application April 16, 1928. Serial No. 270,176

9 Claims. (Cl. 188—78)

This invention relates to brakes, and is illustrated as embodied in an internal expanding brake for an automobile. An object of the invention is to provide simple and efficient operating and adjusting means for the brake.

In one desirable arrangement, the brake is applied by a novel flexible element, shown as a chain having anti-friction rollers on the pivots connecting its links, coming into the brake drum parallel to the drum axis and then turning substantially at right angles for connection with a toggle or equivalent applying means. Preferably the flexible element extends through a hollow member, embodying considerable novelty in its structural form, and which is shown as adapted to serve as the brake anchorage.

Other objects and features of the invention, including a novel adjustment, and other desirable combinations and structural details, will be apparent from the following description of the illustrative embodiment shown in the accompanying drawing, in which:

Figure 1 is a vertical section through the brake, just inside the brake drum, and showing the brake shoe in side elevation;

Figure 2 is a partial section diametrically through the brake, on the line 2—2 of Figure 1;

Figure 3 is a partial section radially of the brake, on the line 3—3 of Figure 1;

Figure 4 is a section through the brake shoe or band, on the line 4—4 of Figure 1; and Figure 5 is a section corresponding to Figure 4, but showing a modified shoe construction.

The illustrated brake includes a rotatable drum 10, at the open side of which is a support such as a backing plate 12, and within which is the friction means of the brake. The illustrated friction means includes a split continuous band or split ring-shaped shoe 14 (Figures 1–4) built up by fastening together back to back two L-section steel stampings carrying the brake lining 16. As shown in Figure 5, the shoe may be built up of a band 18 carrying the lining, and reinforced by a rolled member or stamping 20 generally U-shaped in section, but formed with side flanges 22.

According to an important minor feature of the invention, the adjustment of the brake is accomplished by a right-and-left threaded member 24 threaded through blocks 26 riveted or welded permanently to the adjacent ends of two sections of the band or shoe 14 (or 18). Member 24 has a central collar 28 which can be engaged by an adjusting tool (not shown). For example, the adjustment may be made by inserting a nail in radial recesses 30 in collar 28. The adjustment is maintained by gripping member 24 with the ends of a wire spring 32 held by a post 34 secured to plate 12. The adjustment, it will be seen, changes the effective length of shoe 14.

In addition to spring 32 adjustable means such as eccentrics 36 and 38 may be provided to determine the released position of the shoe 14. The illustrated eccentrics are grooved to embrace the central stiffening web of the shoe.

The brake is applied, against the resistance of a return spring 40, by means such as a toggle 42, having its knuckle between the drum axis and the ends of the shoe,—i. e. the toggle opens outwardly of the drum.

According to an important feature of the invention, toggle 42 or an equivalent applying device, is operated by a novel flexible tension element, such as a chain 44 coming into the drum perpendicularly and then turned inwardly at right angles and connected to the knuckle of the toggle. The chain 44 is preferably built up of links connected by pivots 46, on which anti-friction rollers 48 are mounted. As a guide for the chain, I prefer to form a curved surface 50 in line with a slot extending on the lower side and toward plate 12 from the end of a hollow tubular portion 52 of a stationary anchor member having a base 54 bolted to plate 12. Chain 44 extends through the hollow member 52—54.

Preferably the ends of the sectional shoe 14 are formed with sockets fitting over the hollow cylindrical portion 52, which thus serves as an anchor to take the braking torque from one end of the shoe when the drum is turning in one direction and from the other end of the shoe when the drum is turning in the other direction. If it is desired to omit the stop 36 at the bottom of the drum, the chain 44 will lift the shoe bodily, before expanding it, so that both ends of the shoe will engage the rotating drum while still in engagement with the anchor 52, so that one end or the other will be held against the anchor by the drum friction during the expansion of the shoe to complete the application of the brake.

While one illustrative embodiment has been described in detail, it is not my intention to limit the scope of the invention to that particular embodiment, or otherwise than by the terms of the appended claims.

I claim:

1. A brake comprising, in combination, a drum, a hollow member at one side of the drum, friction means anchoring on said member, an applying device for the friction means having a part between said member and the drum axis, and a flexible element extending through said member parallel to the axis of the drum and turned at right angles inwardly of the drum and connected to said part of the applying device.

2. A brake comprising, in combination, a drum, a hollow member at one side of the drum, friction means anchoring on said member, a toggle for applying the friction means having its knuckle between said member and the drum axis, and a flexible element extending through said member parallel to the axis of the drum and turned at right angles inwardly of the drum and connected to the knuckle of the toggle.

3. A brake comprising, in combination, a drum, a hollow member at one side of the drum, friction means anchoring on said member, an applying device for the friction means having a part between said member and the drum axis, and a flexible linked chain extending through said member parallel to the axis of the drum and turned at right angles inwardly of the drum and connected to said part of the applying device.

4. A brake comprising, in combination, a drum, a hollow member at one side of the drum, friction means anchoring on said member, a toggle for applying the friction means having its knuckle between said member and the drum axis, and a flexible linked chain extending through said member parallel to the axis of the drum and turned at right angles inwardly of the drum and connected to the knuckle of the toggle.

5. A brake applying device comprising a hollow member having a curved surface at one side, and in combination with a chain including connected links and a series of rollers engaging said surface.

6. A brake applying device comprising a hollow member in combination with a chain including connected links and a series of rollers engaging said member.

7. A brake applying device comprising a chain formed of links connected by pivots, and having anti-friction rollers mounted on said pivots.

8. A brake anchor having a base, and a cylindrical hollow anchor portion projecting from one side of the base and formed with a slot extending from its free end into one side of the anchor portion part of the way toward the base.

9. A brake anchor having a base, and a cylindrical hollow anchor portion projecting from one side of the base and formed with a slot extending from its free end into one side of the anchor portion part of the way toward the base, and having a curved guide surface in line with said slot.

LUDGER E. LA BRIE.